(12) United States Patent
Baker et al.

(10) Patent No.: US 11,174,177 B2
(45) Date of Patent: Nov. 16, 2021

(54) SYSTEMS AND METHODS FOR CONTROLLING AQUATIC PESTS WITH SULFUROUS ACID

(71) Applicant: Agua Dulce LLC, Draper, UT (US)

(72) Inventors: Jon Baker, Sandy, UT (US); Paul Thomson Baker, Holladay, UT (US)

(73) Assignee: Agua Dulce LLC, Draper, UT (US)

( * ) Notice: Subject to any disclaimer, the term of this patent is extended or adjusted under 35 U.S.C. 154(b) by 110 days.

(21) Appl. No.: 16/541,912

(22) Filed: Aug. 15, 2019

(65) Prior Publication Data

US 2019/0367388 A1 Dec. 5, 2019

Related U.S. Application Data

(63) Continuation-in-part of application No. PCT/US2018/018514, filed on Feb. 16, 2018.
(Continued)

(51) Int. Cl.
*C02F 1/50* (2006.01)
*C02F 1/66* (2006.01)
(Continued)

(52) U.S. Cl.
CPC ............ *C02F 1/50* (2013.01); *C02F 1/66* (2013.01); *C02F 1/68* (2013.01); *C02F 2103/007* (2013.01); *C02F 2303/04* (2013.01)

(58) Field of Classification Search
USPC .............................. 210/764, 750; 43/1; 119/4
See application file for complete search history.

(56) References Cited

U.S. PATENT DOCUMENTS 2,377,148 A * 5/1945 Hechenbleikner ..... A01N 41/02
514/517
2,730,529 A * 1/1956 Gatzi ................... C07D 317/72
549/341
(Continued)

FOREIGN PATENT DOCUMENTS

WO 00/20338 A2 4/2000

OTHER PUBLICATIONS

Extended European Search Report dated Jul. 29, 2020 as received in Application No. 18753876.4.
(Continued)

*Primary Examiner* — Nina Bhat
(74) *Attorney, Agent, or Firm* — Maschoff Brennan; Jonathan M. Benns (57) ABSTRACT

A method of controlling aquatic pests: introducing sulfurous acid into water having the aquatic pests to treat the water until the aquatic pests are controlled, wherein the water is selected from open water, flowing water, or water open to the atmosphere. The aquatic pests are controlled within a control distance, which is within a distance of less than a mile from the site of introducing the sulfurous acid. The water can be open water or contained water, and the method comprises producing the sulfurous acid at a site of sulfurous acid introduction into the water. The aquatic pest is a zebra mussel, an Asiatic clam, a bryozoan or others. The method can include introducing the sulfurous acid so that the treated water has a pH of between about 6 and 6.5. The method can include introducing the sulfurous acid so that the treated water includes sulfites, bisulfites, and/or sulfur dioxide.

20 Claims, 6 Drawing Sheets

Related U.S. Application Data (60) Provisional application No. 62/459,778, filed on Feb. 16, 2017.

(51) Int. Cl.
*C02F 1/68* (2006.01)
*C02F 103/00* (2006.01)

(56) References Cited

U.S. PATENT DOCUMENTS

| | | | | |
|---|---|---|---|---|
| 4,328,638 A | * | 5/1982 | Smithson | A01N 59/02 43/124 |
| 4,643,835 A | * | 2/1987 | Koeplin-Gall | C02F 1/766 210/754 |
| 4,789,489 A | * | 12/1988 | Hollis | C02F 1/50 210/755 |
| 4,872,999 A | * | 10/1989 | Schild | C02F 1/766 210/754 |
| 5,141,754 A | * | 8/1992 | Ekis, Jr. | C02F 1/766 210/754 |
| 5,192,451 A | * | 3/1993 | Gill | A01N 33/12 210/755 |
| 5,209,934 A | * | 5/1993 | Ekis, Jr. | C02F 1/766 210/754 |
| 5,376,282 A | * | 12/1994 | Chang | C02F 1/20 210/750 |
| 5,393,781 A | * | 2/1995 | Vegega | A01N 37/16 514/557 |
| 5,468,739 A | * | 11/1995 | Whitekettle | C02F 1/50 514/75 |
| 5,520,821 A | * | 5/1996 | Screptock | C02F 1/76 210/744 |
| 5,695,552 A | * | 12/1997 | Taylor | A01N 63/10 106/15.05 |
| 5,979,478 A | * | 11/1999 | Screptock | C02F 1/50 137/101.25 |
| 6,821,442 B1 | * | 11/2004 | Watten | C02F 1/20 210/750 |
| 2002/0098979 A1 | | 7/2002 | Cutler et al. | |
| 2004/0232089 A1 | | 11/2004 | Manzotti et al. | |
| 2008/0044341 A1 | * | 2/2008 | Muller | B01D 53/507 423/522 |
| 2008/0044342 A1 | * | 2/2008 | Muller | C01B 17/54 423/522 |
| 2010/0234436 A1 | * | 9/2010 | Dairiki | A01N 43/80 514/373 |
| 2011/0198285 A1 | | 8/2011 | Wallace | |
| 2012/0211440 A1 | * | 8/2012 | Gong | C02F 1/70 210/757 |

OTHER PUBLICATIONS

International Search Report and Written Opinion dated Apr. 30, 2018 in application No. PCT/US18/18514.

* cited by examiner

| | Initial | | | Final |
|---|---|---|---|---|
| | pH | pH | pH | pH |
| TEST 1 | 9.51 | 6.5 | 6 | 5.5 |
| Sulfurous Acid Added (g/m³) | 0 | 5.3 | 8.5 | 11.2 |
| HCO3 % | 28% | 16% | 9% | 2% |
| TEST 2 | 7.83 | 6.5 | 6 | 5.5 |
| Sulfurous Acid Added (g/m³) | 0 | 23.9 | 39.7 | 52.7 |
| HCO3 % | 38% | 23% | 12% | 2% |
| TEST 3 | 7.64 | 6.5 | 6 | 5.5 |
| Sulfurous Acid Added (g/m³) | 0 | 13.9 | 22.4 | 29.4 |
| HCO3 % | 37% | 22% | 12% | 2% |
| TEST 4 | 7.64 | 6.5 | 6 | 5.5 |
| Sulfurous Acid Added (g/m³) | 0 | 13.9 | 22.4 | 29.4 |
| HCO3 % | 37% | 22% | 12% | 2% |

SYSTEMS AND METHODS FOR CONTROLLING AQUATIC PESTS WITH SULFUROUS ACID

CROSS-REFERENCE

This patent application is a Continuation-in-Part of PCT Application No. PCT/US2018/018514 filed Feb. 16, 2018, which claims priority to U.S. Provisional Application No. 62/459,778 filed Feb. 16, 2017, which provisional is incorporated herein by specific reference in its entirety.

BACKGROUND

Aquatic pests are a well-known nuisance that plague many water ways as well as ballast water in boats. The aquatic pests are invasive and difficult to kill. Once a body of water is contaminated with an invasive aquatic pest, the water is considered contaminated and extra precautions have to be maintained to prevent further spreading and contamination of other bodies of water.

Various water treatment protocols have been attempted to clean open bodies of water (e.g., ponds, lakes, creeks, streams, rivers, etc.) or enclosed bodies of water (e.g., ballast water, container water, on-boat water, etc.). However, the difficulty of decontaminating an open body of water from aquatic pests provides an indication that further and improved aquatic pest decontamination procedures are needed. Additionally, the expense of some treatment protocols for treating an open body of water also provides an indication that cost-effective aquatic pest decontamination procedures are needed.

Thus, it would be beneficial to have an improved aquatic pest decontamination procedure that uses a cost-effective decontamination agent that can decontaminate open bodies of water.

SUMMARY

In one embodiment, the present invention provides a method of forming an aqueous composition capable of killing aquatic pests as well as an open body of water having aquatic pests that are alive and/or dead in the presence of sulfurous acid. As such, an aquatic pest-controlling composition can include: water; an aquatic pest in the water; and sulfurous acid in the water, wherein the water is open water. The open water can be contaminated with live aqueous pests or with dead aqueous pests, such as those that have been killed by the sulfurous acid. In one aspect, the water is not in a ballast or bilge. In one aspect, the open water is open to the atmosphere. In one aspect, the water is not pressurized, such as the water is open to the atmosphere and has ambient conditions, such as pressure, temperature, etc.

In one embodiment, the aquatic pests that are controlled by the composition and method described herein are listed in Table 1 provided herein. For example, the aquatic pest is a zebra mussel, an Asiatic clam, and/or a bryozoan, or a cyanobacteria.

In one embodiment, the water having the sulfurous acid has a pH within a range that is effective for controlling aquatic pests, such as to kill the aquatic pest or inhibit reproduction in the aquatic pest, or otherwise control a population of aquatic pests, such as inhibiting spread of the aquatic pests into other open bodies of water or connected open water ways. The pH range may include a pH of greater than or about 6, a pH of greater than or about 6.5, a pH of greater than or about 7, a pH of between about 6 and 7, or a pH of between about 6 and 6.5. The pH can be controlled with the sulfurous acid.

In one embodiment, the water includes sulfurous acid and reaction products of sulfurous acid and water as well as with other substances in water. As such, the water can include sulfurous acid along with sulfites, bisulfites, sulfur dioxide or others.

In one embodiment, the open water can be any open water, such as in one aspect the water is stationary, and in another aspect, the water is flowing.

In one embodiment, the present invention includes a method of controlling aquatic pests, where such a method includes: introducing sulfurous acid into water having the aquatic pests to treat the water until the aquatic pests are controlled. The control of the pests includes killing the aquatic pests as well as controlling the population so that the population does not increase in number of pests, preferably maintaining the number of pests within a range, or more preferably killing and reducing the aquatic pests, and most preferably killing all of the aquatic pests or reducing the number of aquatic pests below a threshold or a percentage compared to the amount of aquatic pests before the sulfurous acid treatment method. In one aspect, the killing includes killing at least about 75% of the aquatic pests in the water or, the killing includes killing at least about 99% of the aquatic pests in the water.

In one embodiment, the open water has the aquatic pests controlled at a distance from the location of introduction of the sulfurous acid, where the distance of control can be increased by introducing the sulfurous acid at a controlled rate or distribution profile. In one aspect, the control is within a distance of less than a mile from the site of introducing the sulfurous acid, or less than 0.5 miles, or less than 0.25 miles, or less than 0.15 miles, or less than 0.1 miles, or less than 0.05 miles, or less than 0.001 miles from the site of introducing the sulfurous acid.

In one embodiment, the sulfurous acid can be introduced into the open water at a specified introduction regimen. Such an introduction regimen can include: introducing the sulfurous acid at least daily for a duration until the aquatic pests are controlled; introducing the sulfurous acid at least hourly for a duration until the aquatic pests are controlled; introducing the sulfurous acid continuously for a duration until the aquatic pests are controlled; or introducing the sulfurous acid semi-continuously for a duration until the aquatic pests are controlled.

In one embodiment, the introduction of sulfurous acid occurs when the water is open water, the water is contained water, the water is open to the atmosphere, and/or the water is not pressurized by the introduction of the sulfurous acid.

In one embodiment, the method includes introducing the sulfurous acid so that a pH is achieved in treated water within a control distance relative to the site where the sulfurous acid is introduced. The method includes: introducing the sulfurous acid so that the treated water has a pH of greater than or about 6; the sulfurous acid so that the treated water has a pH of greater than or about 6.5; introducing the sulfurous acid so that the treated water has a pH of greater than or about 7; introducing the sulfurous acid so that the treated water has a pH of between about 6 and 7; and introducing the sulfurous acid so that the treated water has a pH of between about 6 and 6.5 or between 6.8-7 (e.g., for cyanobacteria).

In one embodiment, the method can include introducing the water so that the sulfurous acid reacts with the water to form reaction products or other substances are introduced into the water along with the sulfurous acid, where the other substances may be byproducts of the method of forming the sulfurous acid, such as forming aqueous sulfurous acid with a sulfur burning system that introduces the exhaust of the burned sulfur into water to form aqueous sulfurous acid. As such, the method can include introducing the sulfurous acid so that the treated water includes sulfites; introducing the sulfurous acid so that the treated water has bisulfites; and/or introducing the sulfurous acid so that the treated water has sulfur dioxide, which substances can be introduced into the water along with the sulfurous acid or are created in the water as reaction products.

In one embodiment, the method can include introducing the sulfurous acid so that the treated water has ambient conditions, and the water is stationary or the water is flowing. In one aspect, the method can include introducing the sulfurous acid without intentionally introducing carbon dioxide. In one aspect, the method can include introducing the sulfurous acid without increasing pressure of the treated water. In one aspect, the method can include introducing the sulfurous acid into water that flows into a body of water having or suspected of having the aquatic pest. In one aspect, the method can include introducing the sulfurous acid into water that flows from a body of water having or suspected of having the aquatic pest. In one aspect, the method can include introducing the sulfurous acid onto the aquatic pest. In one aspect, the method can include introducing the sulfurous acid to a surface having the aquatic pest attached thereto, such as a bulkhead, post in the water, boat in the water, dock, or any other surface in the water.

In one embodiment, the method includes introducing the sulfurous acid so as to achieve about 100% kill of bryozoan in about 48 hours or less in the treated water within a control distance from the site of introducing the sulfurous acid. In one embodiment, the method includes introducing the sulfurous acid so as to achieve 100% kill of zebra mussels in about 5 days or less. In one embodiment, the method includes introducing the sulfurous acid so as to achieve 100% kill of Asiatic clams in about one month or less.

In one embodiment, the method includes introducing the sulfurous acid to achieve a certain concentration in the treated water within a control distance from the site of introducing the sulfurous acid. The method can include introducing the sulfurous acid so as to achieve $SO_2$ concentrations or sulfurous acid concentrations at 2.84% to 28.4% in the treated water.

In one embodiment, the method can include forming the sulfurous acid and then introducing it into the water. This can include forming the sulfurous acid and providing the sulfurous acid to the water without storing the sulfurous acid, or the sulfurous acid can be stored for some duration of time after making the sulfurous acid before it is introduced into the water. Accordingly, the method can include: forming sulfur dioxide; and introducing the sulfur dioxide into the water so as to cause formation of sulfur dioxide in order to introduce the sulfurous acid to the water. The method can include burning sulfur to produce exhaust having sulfur dioxide, where the exhaust is introduced into water, such as in a sulfur burner system or into the water to produce treated water. In one aspect, the method can include deoxygenating the water with the sulfur dioxide, sulfurous acid, sulfites, or bisulfites.

In one embodiment, the present invention includes a method of controlling aquatic pests, where the method can include: burning sulfur to produce exhaust having sulfur dioxide; and introducing the exhaust into water having the aquatic pests to treat the water until the aquatic pests are controlled.

In one embodiment, the method of controlling aquatic pests can include: burning sulfur to produce exhaust having sulfur dioxide; introducing the exhaust into water to produce sulfurous acid; and introducing the sulfurous acid into water having the aquatic pests to treat the water until the aquatic pests are controlled.

In one embodiment, the method of controlling aquatic pests can include: burning sulfur to produce exhaust having sulfur dioxide; introducing the exhaust into water to produce aqueous sulfurous acid; introducing the exhaust into the sulfurous acid to decrease pH of the aqueous sulfurous acid; and introducing the aqueous sulfurous acid with the decreased pH into water having the aquatic pests to treat the water until the aquatic pests are controlled.

In one embodiment, a method of controlling aquatic pests can include: burning sulfur to produce exhaust having sulfur dioxide in a sulfur burner system; introducing the exhaust into water to produce aqueous sulfurous acid in the sulfur burner system; recycling the sulfurous acid through the sulfur burner system to decrease pH of the aqueous sulfurous acid; and introducing the aqueous sulfurous acid with the decreased pH into water having the aquatic pests to treat the water until the aquatic pests are controlled.

It should be recognized that the different steps of the methods may be combined with the steps of any of the methods recited herein. Such methods may result in the pests being controlled by one or more of the following factors from the introduction of sulfurous acid, such as: (1) reduce pH of the water; (2) reduce dissolved oxygen in the water; (3) increase dissolved $CO_2$ in the water; (4) reduce bicarbonate so that the aquatic pests do not have sufficient bicarbonate for their life cycle, such as not being able to form shells, exoskeletons, or bones or other body structures; and (5) increasing sulfurous acid, sulfur, sulfur particulates, sulfites, and disulfites, that can be toxic to the aquatic pests. In one aspect, the factors are two or more of the factors. In one aspect, the factors are three of more of the factors. In one aspect, the factors are four of more of the factors. In one aspect, the factors are all five of the factors.

In one embodiment, the method includes introducing the sulfurous acid into the water for a duration that kills at least 95% of the cyanobacteria without controlling a target organism, the target organism being a native animal in the water or a non-pest animal that is introduced into the water. In some aspects, the native animal or non-pest animal is an endangered species.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

The subject matter of the figures includes elements arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, sulfurous acid can be obtained by any method and used to control aquatic pests in order to inhibit the spread of the aquatic pests or inhibit reproduction of aquatic pests or kill the aquatic pests or otherwise control the aquatic pests. The sulfurous acid can be used to treat water, such as open water or confined water having the aquatic pests. By application to water, the sulfurous acid can control the aquatic pests therein, which can be beneficial for avoiding the well-known complications that arise due to aquatic pests, which are often invasive species. By application to open water (e.g., ponds, creeks, streams, lakes, marshes, reservoirs, rivers, canals, irrigation canals, etc.), sulfurous acid can be used to control the aquatic pests to prevent the spread throughout the open water and kill the aquatic pests. By application to confined water (e.g., bilge, pipes, conduits, tanks, containers, etc.), sulfurous acid can be used to control the aquatic pests to prevent the spread throughout the confined water and kill the aquatic pests in order to inhibit the contaminated confined water from being purposefully or accidentally introduced into an uncontaminated body of open water. Accordingly, sulfurous acid can be used in treatments of water that has or is suspected of having aquatic pests, such as the aquatic pests described herein.

Sulfurous acid is a chemical compound which has a formula $H_2SO_3$, and is a weak and unstable acid, formed when sulfur dioxide dissolves in water. It is a reducing, as well as a bleaching agent. The sulfurous acid compound is formed in the aqueous solution. Accordingly, treatments described herein include an aqueous solution having the sulfurous acid. The acidity of sulfurous acid is 1.5 on the pH scale. Sulfurous acid is a weak and dibasic acid, and it corresponds to the +4 oxidation state of sulfur. The sulfurous acid compositions can have up to 6% sulfurous acid in water (e.g., based on 6% sulfur dioxide), or more if possible. The sulfurous acid compositions useful in the treatment can be obtained by the systems and processes of U.S. Pat. No. 6,080,368, or other documents incorporated herein by specific reference.

Sulfurous acid

In one embodiment, the present invention relates in general to a method for killing aquatic pests in an environmentally friendly manner, where the exhaust products such as sulfur dioxide (e.g., exhaust directly from a sulfur burn chamber) from burning sulfur and reaction products of the exhaust products and water contribute to controlling the pests. It is known that the exhaust products from burning sulfur and reaction products of the exhaust products and water are environmentally safe. Also, the invention allows for controlling aquatic vertebrate and invertebrate invasive species (e.g., aquatic pests). Here, the exhaust products include sulfur dioxide and sulfur particles that can be mixed with water to produce sulfurous acid, sulfites, bisulfites or the like. Also, the sulfur particles that are entrained in the exhaust gas directly from a sulfur burn chamber may contribute to controlling the aquatic pests.

In one embodiment, the sulfurous acid can be used to control any aquatic pest. The sulfurous acid can be applied to the water in an amount that inhibits the life cycle of the aquatic pest, which can inhibit aquatic pest growth, reproduction, and spreading, and kill the aquatic pest.

Preliminary testing shows that sulfurous acid, when applied to a water having aquatic pest, reduces the aquatic pest count. Thus, sulfurous acid can be used to treat water to control existing aquatic pest as well as condition the water to inhibit spreading of any aquatic pests introduced therein. This can inhibit spreading from a first body of water to a second body of water, such as from a pond to a stream or from a stream into a pond. While providing the sulfurous acid prohibits or prevents aquatic pest infestations or can be used as a prophylactic against aquatic pest infestations, application to the water can be done for the desire to control any aquatic pest in the water or soil in contact with the water (e.g., river bed, pond bed, shore, or other soil in direct contact with the water), or that may come into contact therewith. Also, the sulfurous acid can treat the surfaces of any water system or any surface of any object in the water to inhibit aquatic pest from attaching thereto, remove the aquatic pests from the surface (e.g., descale) or otherwise inhibit the aquatic pest from contaminating the water system. Thus, it may be desirable to apply the sulfurous acid to a water or soil contacting the water or structure confining the water as desired.

Sulfurous acid may be used to control mollusks (e.g., zebra mussels, Asiatic cams, barnacles, cyanobacteria, etc.), bryozoa, or other aquatic pests in open water or contained water. In other cases, sulfurous acid may be applied as a nutrient for water vegetation or be used as a fungicide or bactericide. Also, sulfurous acid may have an effect that minimizes algae populations, which can reduce different types of cyanobacteria or other algae. Thus, the methods can be used for controlling a combination of these pests.

The sulfurous acid used in the treatments described herein can be obtained from any process, such as the sulfur burner systems shown in the incorporated references.

Figure 1:
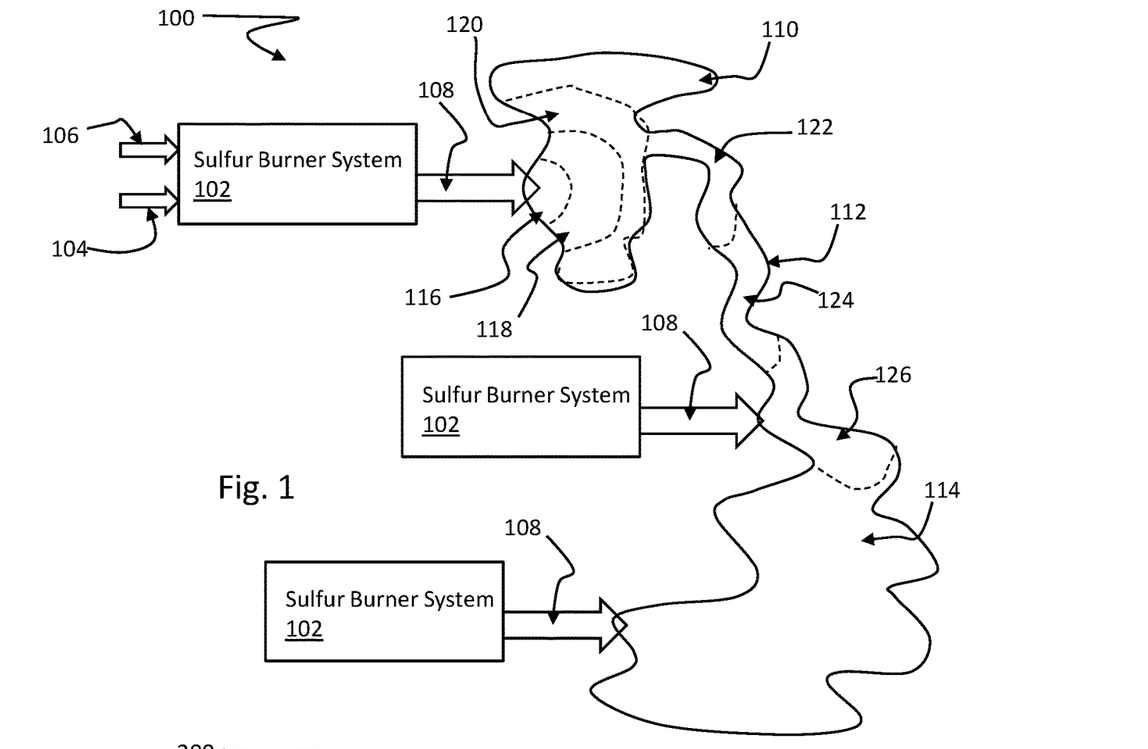
FIG. 1 shows an embodiment of a system for reducing aquatic pests in a body of water.

FIG. 1 shows a system 100 that includes a sulfur burner system 102 that provides a sulfur burner system product 108 (e.g., burned sulfur exhaust, sulfurous acid, sulfur dioxide, sulfites, bisulfites, etc.) into water, such as a pond 110, creek 112, or lake 114 or other similar types of natural or man-made open waterways. Sulfur 104 is provided and burned in the sulfur burner system 102, and optionally mixed with water 106 in order to make the sulfur burner system product 108. The introduction of the sulfur burner system product 108 into a first zone 116 can treat the first zone 116, which can extend out a control distance to a second zone 118, third zone 120, fourth zone 122, fifth zone 124, and sixth zone 126, and so on. The pH can be controlled as described herein through these zones at the control distances from the location of introduction in the first zone 116. The sulfur burner system product 108 is used to control aquatic pests within the pond 110, creek, or lake 114. If needed, the sulfur burner system 102 can be moved from location to location (e.g., pond 110, creek 112, or lake 114) or multiple sulfur burner systems 102 being placed at these different locations at the same time.

The sulfur burner system 102 may introduce exhaust directly into the water being treated to produce sulfurous acid in the water being treated, or the exhaust may be mixed with water to produce sulfurous acid that is then used to treat the water.

Figure 2:
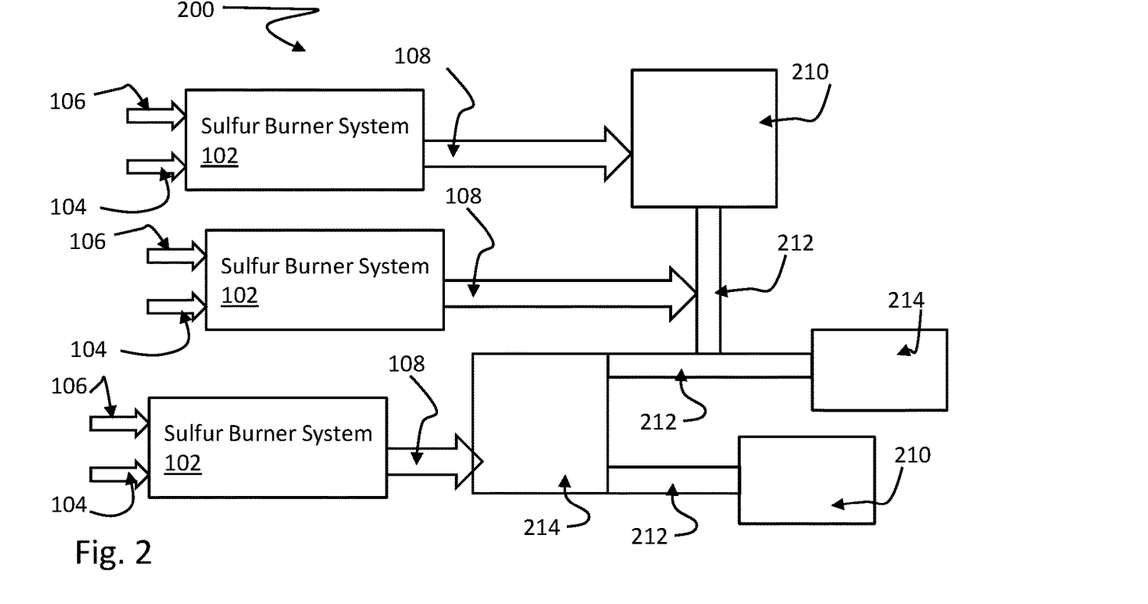
FIG. 2 shows an embodiment of a system for reducing aquatic pests in a man-made water system.

FIG. 2 shows a system 200 that includes a sulfur burner system 102 that provides a sulfur burner system product 108 (e.g., burned sulfur exhaust, sulfurous acid, sulfur dioxide, sulfites, bisulfites, etc.) into water, such as a closed water tank 210, closed pipe 212, or open water tank 214 or other similar types of man-made industrial waterways. Sulfur 104 is provided and burned in the sulfur burner system, and optionally mixed with water 106 in order to make the sulfur burner system product 108. Thus, the methods described herein can be used for man-made water systems as well as natural water systems.

Figure 3:
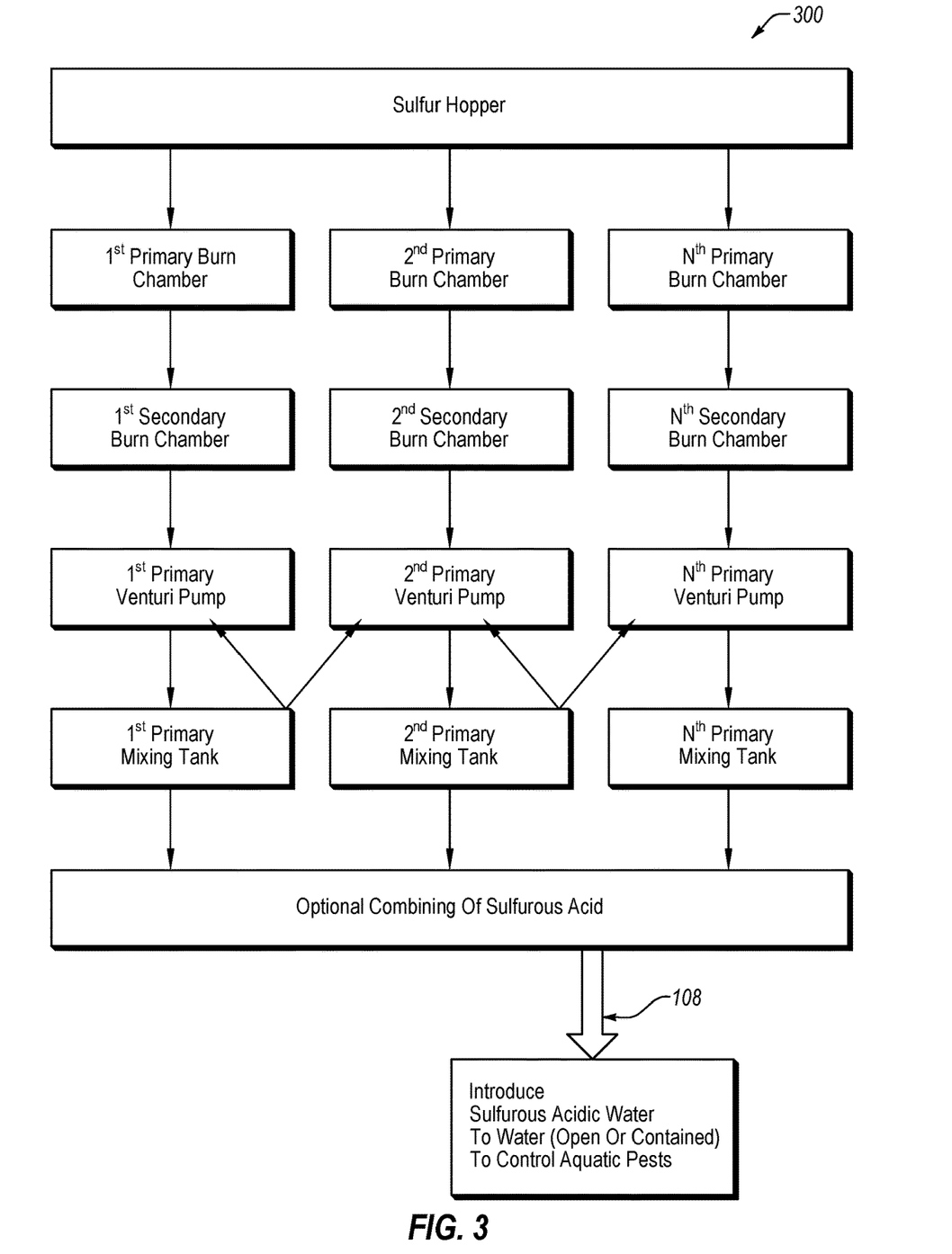
FIG. 3 shows an embodiment of a schematic of a sulfur burner system that can produce sulfurous acid for use in controlling aquatic pests.

FIG. 3 shows an example of a sulfur burner system 300 where a sulfur hopper can provide sulfur to a primary burn chamber (e.g., $1^{st}$, $2^{nd}$, Nth), then the exhaust from the primary burn chamber goes into a secondary burn chamber (e.g., $1^{st}$, $2^{nd}$, Nth) for a second burn of matter in the exhaust. Then, the exhaust from the secondary burn chamber goes into a primary venturi pump (e.g., $1^{st}$, $2^{nd}$, Nth) where it is mixed with water to form the sulfurous acid and deposited into a primary mixing tank (e.g., $1^{st}$, $2^{nd}$, Nth) to mix the exhaust and water to form sulfurous acid. Optionally, the sulfurous acid from the primary mixing tanks (e.g., $1^{st}$, $2^{nd}$, Nth) can be mixed. The sulfurous acidic water is introduced into the water to control the aquatic pests.

Figure 4:
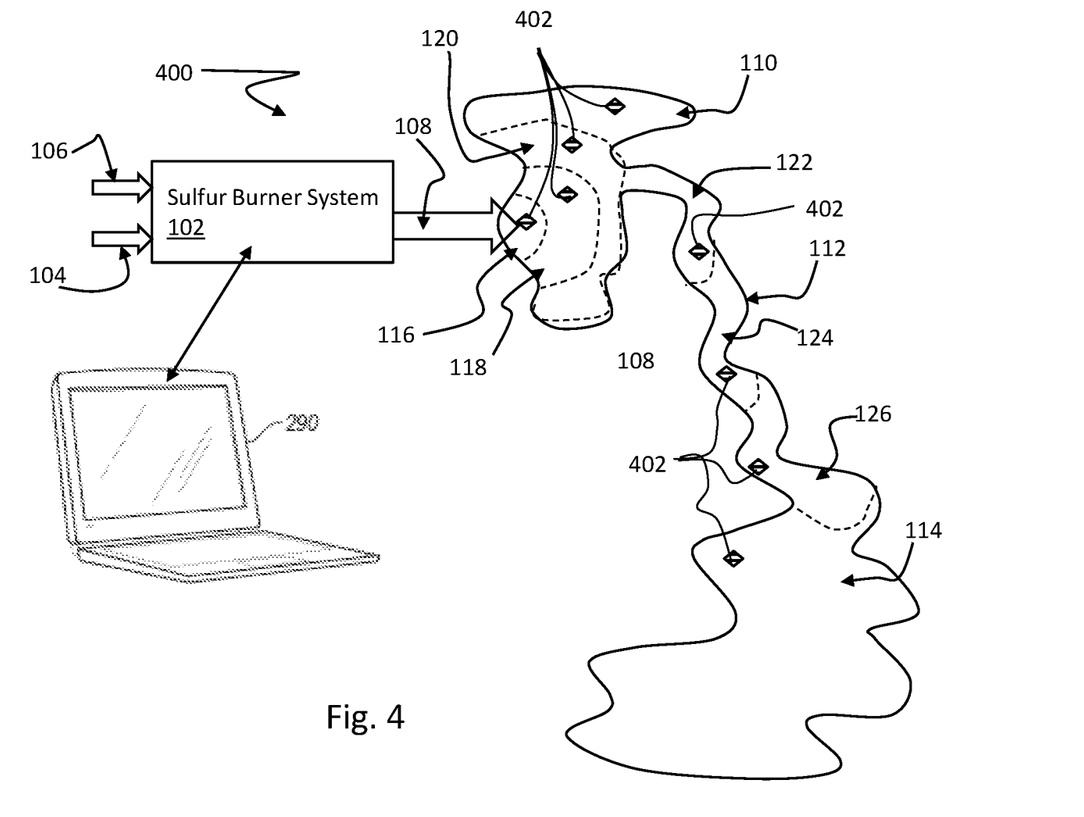
FIG. 4 shows an embodiment of a computer controlled system for reducing aquatic pests.

FIG. 4 shows a system 400 that includes a sulfur burner system 102 either having or being operably coupled with a computer 290, wherein the computer is configured as a controller for the system 400. The computer 290 includes a processor (e.g., microprocessor) and one or more memory storage devices that can include computer-executable instructions for treating water with sulfur burner system product 108 (e.g., exhaust, sulfurous acid, sulfur dioxide, sulfites, bisulfites, etc.). The computer 290 can control the acidity and amount of sulfur burner system product 108 that is output into the water. The system 400 includes sensors 402, which can be any type of sensor, such as pH sensor, thermocouple sensor, turbidity sensor, oxygen sensor, sulfur sensor, or combination thereof. Each sensor 402 can be operably coupled with the computer 290, either wired (e.g., electrical or optical) or wirelessly so as to provide sensor data to the computer 290. The sensor data can be pH, temperature, turbidity, oxygen level, sulfur level, or combination thereof or other sensor data. In response to the sensor data, the computer 290 can implement computer control to control the sulfur burner system 102 so as to control the formation of sulfuric acid in acidity or amount, and control the amount and/or rate of sulfurous acid being introduced into the water, and thereby control the pH of the water. The computer 290 can modulate the sulfur burner system 102 in response to the sensor data until receiving sensor data shows the data is within a defined data range (e.g., pH range defined herein). As such, the pH can be controlled across the first zone 116, which can extend out a control distance to a second zone 118, third zone 120, fourth zone 122, fifth zone 124, and sixth zone 126, and so on. The computer 290 may also start or stop the system 400 as programmed or upon receiving sensor data.

It is an embodiment of the present invention to provide a method for the treatment of water (e.g., open or contained) comprising treating the water with an effective dose of sulfurous acid so as to prevent or reduce the incidence of aquatic pest colonization or spread to the water. It is an embodiment of the present invention to provide a method for the treatment of open water comprising treating the open water with an effective dose of sulfurous acid so as to prevent or reduce or terminate the incidence of aquatic pest colonization to said open water and kill the aquatic pests. It is also an embodiment of the present invention to provide a method for the treatment contained water comprising treating the contained water with an effective dose of sulfurous acid so as to prevent or reduce or terminate the incidence of aquatic pest colonization to said contained water and kill the aquatic pests. It is an embodiment of the present invention to provide a method for the treatment of water comprising treating the water (e.g., open or contained) with an effective dose of sulfurous acid so as to prevent or reduce or terminate the incidence of bacterial or fungal or algal colonization in the water and kill the aquatic pests. It is a further embodiment of the present invention that the dose of sulfurous acid may be applied as a flow, dump, pour, or a spray or any other administration of aqueous sulfurous acid. It should be understood that sulfur dioxide may be prepared and introduced into the water in order to generate the sulfurous acid as well as sulfites and bisulfites.

Applicant have performed studies and determined that the present water treatment methods with sulfurous acid provide about 100% kill of bryozoa in 48 hours, 100% kill of zebra mussels in 5 days, and 100% kill of Asiatic clams in less than one month. In these studies, the protocols introduced sulfurous acid into open water to achieve water pH levels between 6.0 and 6.5 in the treatment water within a control distance from the location of introduction. Accordingly, these pH ranges are sufficient to control these aquatic species. This allows these relatively higher pH ranges to control the aquatic species without compromising the body of water. The cyanobacteria can have a 100% kill from the sulfurous acid with a pH of the treated water between 6-7, or more preferably between 6.8-7.

Contrary to prior protocols for contained water (e.g., U.S. Pat. No. 6,821,442, which is incorporated herein), the present invention does not require gas to be introduced into the contained water with a positive pressure. As such, the present technique can introduce aqueous sulfurous acid that is mixed with the contained water or open water. Also, exhaust from a sulfur burner that has sulfur dioxide (e.g., exhaust directly from a sulfur burn chamber) may be introduced into the contained water at atmospheric or ambient pressures (e.g., without positive pressure) so that the sulfur dioxide in the sulfur burn chamber exhaust can mix with the contained water to form the sulfurous acid in situ. Thus, the present advancement in the technology avoids the limitations of prior protocols.

Contrary to prior protocols that only apply to contained water, such as ballast water (U.S. 2012/0211440), the present technology can be applied to open water (e.g., pond, lake, etc.), moving open water (e.g., stream, creek, river, irrigation canal, etc.) moving or flowing contained water (e.g., pipe, conduit, etc.) and contained water (e.g., tank, container, etc.). Moreover, the technology can be used in significantly more water environments than just ballast water. Thus, the present advancement in the technology avoids the limitations of prior protocols.

In one embodiment, the administration of sulfurous acid or generation of sulfurous acid in the water allows for controlling and causing death of target aquatic invasive species by exploiting their sensitivity to sulfurous acid as well as sulfites and bisulfites, and possibly sulfur dioxide or reaction products from these compounds interacting with water. The method is economical, environmentally safe and applicable to both freshwater and/or marine waters (e.g., ocean, salty) and/or brackish waters in open water systems or contained water systems. Use of the invention is particularly attractive in controlling major macro fouling species in open water and water intake structures/conduits supporting municipal potable water, agricultural, industrial and power station raw water systems. For example, cyanobacteria blooms can provide significant toxicity to the water, where sulfurous acid treatment can control the cyanobacteria in order to reduce the toxicity. Reduction of toxicity can be important where the water at a cyanobacteria bloom infestation location or downstream thereof where water is used for irrigation, recreation, or culinary uses that can impact health of animals (e.g., humans).

In one embodiment, the present invention includes administering sufficient sulfurous acid into open water or contained water that has nonindigenous aquatic invasive species in order to control these aquatic invasive species. It is thought, without being bound thereto, that the sulfurous acid lowers the pH (e.g., to about pH 6-6.5), provides sulfurous acid, provides free $SO_2$, free sulfites, and free bisulfites that can kill the invasive species. In any event, the exhaust from burning sulfur that has sulfur dioxide (e.g., exhaust directly from a sulfur burn chamber) can be introduced into water to result in a treatment composition (e.g., sulfurous acid along with other sulfur-containing components) that control the aquatic invasive species.

Contrary to the prior art, the pH of the water after treatment is significantly higher than previously reported. As such, the pH can be well-above 4.5, where the present technology can provide pH between 6-7, or 6.8-7 (e.g., to control cyanobacteria). The pH selected varies upon the exposure time required for killing the invasive species. The present invention allows for sustained application of sulfurous acid from a sulfur burner system so that the water can be controlled at a certain pH over the control distance from the site of introduction.

In view of the pH being about just below neutral or slightly acidic, it is thought, without being bound thereto, that the acid (e.g., sulfurous acid, sulfuric acid, or other acid) eliminates the cyanobacteria, clams and mussels by eliminating oxygen in the water. Accordingly, reducing dissolved oxygen with sulfurous acid or other combustion products from burning sulfur can reduce oxygen to control the aquatic pests. Similarly, reducing oxygen with the sulfurous acid can eliminate some bacteria, fungi, and algae (e.g., cyanobacteria). In some aspects, a drop in pH to the ranges recited herein, such as pH between 6-7, or 6.8-7, obtained by use of any acid can be used to control cyanobacteria.

Previously, it was found that the use of sulfuric acid and low pH has been shown to kill the clams, but only in some cases. However, now the present studies performed by the inventor have showed that reducing the pH to 7.1 with sulfurous acid was more effective than reducing the pH to 3.0 with sulfuric acid in order to control the aquatic pests. Accordingly, there is reason to believe that the acidity alone is not the reason the data demonstrated a 100% kill rate for the aquatic pests, as recited herein. The data suggests that sulfurous acid treatment of water is not simply lowering the pH in order to achieve a high kill rate, which indicates that the exhaust products from burning sulfur that has sulfur dioxide (e.g., exhaust directly from a sulfur burn chamber), which include the reaction products of the exhaust products and water likely cause the high kill rate. Thus, exhaust products from burning sulfur and reaction products of the exhaust products (e.g., reaction products from reacting sulfur dioxide with water or reacting other sulfur-containing substance in the exhaust with water) and water can be used to control the aquatic pets. In one aspect, sulfuric acid is specifically not used in the methods described herein.

Studies have also provided data that shows there is a link between calcium levels in the water and survival/mortality of the aquatic pests. It was found that low calcium levels result in low survivability for the aquatic pests. Thus, introducing the exhaust products from burning sulfur that has sulfur dioxide (e.g., exhaust directly from a sulfur burn chamber) and reaction products of the exhaust products and water may reduce the calcium in the water in order to control the pests. This may include reducing the overall free calcium level, such as reducing carbonate and bicarbonate levels. In one aspect, the ability of sulfurous acid to degrade carbonates and bicarbonates may contribute to the ability of the present technology controlling pests. In any event, the data shows sulfurous acid can achieve 100% kill rates in the aquatic pests in open and contained water. As referred to herein, the exhaust products include sulfur dioxide and possibly other sulfur-containing substances that are obtained directly from a sulfur burner that burns elemental sulfur.

The ability to prepare exhaust products having sulfur dioxide from burning sulfur and reaction products of the exhaust products and water that are introduced into water or created (e.g., reacting with water) in water provides significant improvements, especially in open water. However, the exhaust products can be mixed with water in a sulfur burning system to produce sulfurous acid and possibly sulfites and bisulfites before this aqueous composition (e.g., sulfurous acid) is used to treat the water having the aquatic pests.

In one aspect, the water treatment is performed in open water and not performed on confined water (e.g., water in any man-made or artificial confinement with small volume, such as in a bilge). Man-made reservoirs and water systems are considered to be open water and similar to the natural water systems (e.g., FIG. 1).

In one aspect, the water treatment is performed without introducing any pressurization (e.g., without increasing pressure of water or atmosphere above the water) because a gas flow of the exhaust products from burning sulfur that has sulfur dioxide (e.g., exhaust directly from a sulfur burn chamber) into the water, or a natural flow of water having the reaction products of the exhaust products and water is used without pressurizing the water or gaseous environment around the water. In one aspect, the water treatment is performed without any change in pressure of the water or air (e.g., delta P of 0).

In one aspect, the water treatment is performed without any pressurizing pump to cause an increase in pressure of gas or water.

In one aspect, the water treatment is performed without gas supersaturation of the water, wherein if any gasses (sulfur burning exhaust products, such as sulfur dioxide) are introduced into the water the gasses do not supersaturate the water.

In one aspect, the water treatment is performed without degassing after the treatment, whether in open water or contained water.

In one aspect, the water treatment is performed without any pH adjustment toward neutrality (e.g., with a base) after the treatment, where the pH is at a sufficiently high level after the treatment to be environmentally safe (e.g., above pH 6 or about pH 6.5-7).

In one aspect, the water treatment is performed without affirmatively or purposefully introducing $CO_2$ gas to reduce pH of water. That is, pure or relatively pure $CO_2$ gas, or combustion products of organic materials is not introduced into the water. It should be understood that the combustion of sulfur may have contaminated sulfur with organic residues that may combust so that very little or trace $CO_2$ gas is introduced into water. The sulfur that is burned is at least about 90% elemental sulfur, more preferably at least 95% elemental sulfur, even more preferably at least about 98% elemental sulfur, and most preferably at least about 99% elemental sulfur. In one aspect, a carbon-containing substance is not intentionally burned in the sulfur burner so that there is no or only infinitesimal $CO_2$ in the sulfur burner exhaust. However, the methods can be performed so that any trace $CO_2$ gas is introduced into a confined water (e.g., in sulfurous acid container), where that confined water is then introduced into the water in order to perform the water treatment. Accordingly, $CO_2$ gas is not directly introduced into the water during water treatment. In one aspect, the water treatment is performed without affirmatively or purposely introducing $CO_2$ into the water, unless the $CO_2$ is a byproduct of sulfur burning. In one aspect, the exhaust gas from the sulfur burner that has $SO_2$ is introduced into water to produce the sulfurous acid, such as described in connection to the figures. The sulfurous acid can be actively or passively degassed to remove any $CO_2$ byproduct before introducing the sulfurous acid to the water to control the aquatic pests. The active degassing can be under vacuum to remove the $CO_2$ byproduct. The passive degassing can be by leaving the sulfurous acid open to the atmosphere in ambient conditions so that the $CO_2$ is a byproduct naturally leaves the sulfurous acid and goes into the atmosphere.

In one aspect, the water treatment is performed so that $SO_2$ concentrations or sulfurous acid concentrations are 2.84% to 28.4% in the water.

In one aspect, the water treatment is performed in a contained water system that does not include a ballast tank. That is, the method is not performed in the environment of a ballast tank or bilge.

In one aspect, the water treatment is performed without lowering the pH below 5.5, or preferably not below pH 5, or preferably not lower than pH 4.5, where it is preferably for the pH to be above 5.5, more preferably above pH 6, such as between pH 6-6.5 or up to 7.1, and as such the pH of the treated water is well over pH 1.5-4.5. This water treatment with higher pH can be in open water or confined water. It may be beneficial for the environment to maintain the treated water having the aquatic pests to be above 5.5, 6, 6.5, or 7 so that the process is gentler on the environment. However, in some instances the lower pH sulfurous acid that is more acidic can be used to lower the treated water having the aquatic pests to pH as low as 5.5, 5, 4.5, 4, 3.5, 3, 2.5, 2, 1.5, or lower. As such, some embodiments use a gentler treatment with sulfurous acid so that the water being treated has a pH above about 6. On the other hand, some embodiments use a harsher treatment with sulfurous acid so that the water being treated has a pH lower than about 6. In one aspect, reducing the pH of the water below 6 can be only in confined water. In one aspect, reducing the pH of the water below 6 can be in either open water or confined water.

In one aspect, the water treatment is performed in manner that is not harmful to the environment, and thereby the time to achieve a sufficient amount of control or kill rate of the aquatic pests is significantly greater than 10 minutes. The present technology uses the sulfurous acid (and other products of sulfur burning) with water so that the time to control pests is on the order of days or weeks. It was found that the water treatment can effectively control the aquatic pests over time without significantly harming a natural habitat or cause problems associated with significant acidity. The longer duration is appropriate in open water so that over time the aquatic pests are controlled and eradicated.

In one aspect, the water treatment is performed in a system without a rustable containment material, such as iron. As such, the water treatment is not performed in any ship confinement area, and is not used to prevent rusting of any metal (e.g., ship's hull or otherwise). The water treatment can be in a polymeric container, polypipes, or other non-metal materials. Also, the water treatment can be performed in metal confinement systems when devoid of excess oxygen atmosphere above the water, such as in metal pipes that are full of water without an oxygen headspace.

In one aspect, the water treatment is not performed in a closed container or closed conduit, or other closed system. In this aspect, the water treatment is performed in open water that is open to the atmosphere, whether natural or man-made, such as a pond, stream, creek, river, canal, or the like.

In one aspect, the water treatment is performed by combusting sulfur to obtain $SO_2$ and introducing the $SO_2$ into water. The water may be a container in a sulfur burning system to produce sulfurous acid and its resulting aqueous forms, including sulfites and bisulfites, which water is then introduced into the water to be treated. Alternatively, the exhaust gas with $SO_2$ is introduced directly into the water to be treated. In either strategy, the sulfurous acid and its resulting aqueous forms, including sulfites and bisulfites are the only active agents to control the aquatic pests. In one aspect, this method is performed in open water that is open to the atmosphere.

In one embodiment, the water treatment is performed daily until a sufficient control level is reached, such as about 75% kill, 80% kill, 90% kill or 99%-100% kill. This process may take hours, days or weeks depending on the volume of water or surface area of open water. The water treatment is not stopped at 50% kill of the aquatic pests. The water treatment can be continuous for the duration of the treatment with sulfurous acid and its resulting aqueous forms, including sulfites and bisulfites, being continuously introduced in a continuous flow. However, the treatment can be in short boluses introduced into the water, such as once an hour, once a day, or other interval so that the water is receiving fresh treatment at least daily until the desired amount of control is achieved (e.g., about 100% kill).

The water treatment can supply a sufficient amount of sulfurous acid and its resulting aqueous forms, including sulfites and bisulfites so that the pH does not drop below about 6.5 or 6, preferably not lower than about 6.5. Accordingly, the volumetric flow can be tailored to achieve this desired pH over hours and days. This allows for dropping the pH to about 6.5 or 6, waiting for the pH to increase before dropping it again. Otherwise, the flow can be continuous or semi-continuous (periodical stops) for the duration of the water treatment.

In one embodiment, the water treatment is performed so that the water is not alkaline once the pH is neutral or slightly acidic. The reduction in pH or inhibition of being alkaline can contribute to controlling the aquatic pests.

In one embodiment, the water treatment is performed so that the sulfurous acid and its resulting aqueous forms, including sulfites and bisulfites reduce the amount or concentration of dissolved oxygen in the water, in part due to the oxygen being consumed by the $SO_2$ in the process of becoming $H_2SO_3$, etc. Deoxygenating the water with the sulfurous acid and its resulting aqueous forms, including sulfites and bisulfites can facilitate control of the aquatic pests.

While the amount of sulfur material introduced into the water during treatment can vary, it should be recognized that the time for a desired kill (e.g., about 100% kill) is reduced in smaller bodies of open and closed/contained water, and longer in larger bodies of water. However, the volume amount of sulfurous acid can be increased for larger bodies of water to reduce the kill time, and decreased for smaller bodies of water for the same kill time. In one aspect, the pH of the water being treated can be measured continuously or semi-continuously (e.g., every minute, hour, number of hours, or every day) to ensure the pH is maintained above about 6 or preferably above or about 6.5.

In one embodiment, the water treatment can be applied to any pipes or canals or ditches leading to or from infected bodies of water that have been infected with an aquatic pest. The method can be performed as described herein. In some instance, the water treatment can be in open water. In other instances, the water treatment can be in closed water systems. The treatment can be without pressurization and without intentionally introducing carbon dioxide (other than as a byproduct or in trace or unmeasurable or ineffective amounts).

In one embodiment, the present invention presents a sulfurous acid generating system and method that increases the sulfur burn efficiency and production of sulfur dioxide gas, and employs a combination of novel blending and mixing mechanisms with water to form sulfurous acid. This system can produce the sulfurous acid that is used to control the pests. The systems and methods can maximize the efficiency and duration of contact between sulfur dioxide gas and water to form sulfurous acid. The system can be configured as an open non-pressurized system. Examples of the sulfur burning system in the figures can be configured as described in WO 2016/183450, which is incorporated herein by specific reference in its entirety. The resulting sulfurous acid can be introduced into the water (e.g., open or contained) to control the pests. As noted, the exhaust from burning sulfur that has sulfur dioxide (e.g., exhaust directly from a sulfur burn chamber) can be used to make sulfurous acid that is introduced into water to control the aquatic pests, or the exhaust having the sulfur dioxide can be introduced directly into the water having the aquatic pests to control these pests so that the sulfurous acid is produced in the water being treated. Also, the exhaust from the sulfur burning system that has had the sulfur dioxide removed (e.g., the sulfur burner system exhaust) may include nitrogen gas and water gas is not used for the methods herein as this gas is not the exhaust directly from the sulfur burner. The methods described herein use the exhaust directly from the sulfur burner or exhaust having significant sulfur dioxide in order to make the sulfurous acid. However, it can be preferred that the sulfur dioxide is processed as described in the sulfur burning systems to make sulfurous acid, and the produced sulfurous acid is introduced into the water to control the aquatic pests.

In some embodiments, a lime wash scrubbing technology can be used to scrub the emissions (e.g., final emissions) of the sulfur burning system by bathing the fumes of the system in a lime wash. In some examples, carbonate salts (e.g., calcium carbonate, sodium carbonate, etc.) in the lime wash can be used to scrub the exhaust fumes. The collected aqueous sulfurous acid can be recycled back to one or more venturi pumps in the sulfur burning system to obtain a lower pH can create higher emissions of sulfur dioxide to flow from the air emissions exhaust. In some embodiments, the exhaust stack is enclosed in an additional scrubbing process by rinsing the fumes with a spray including high pH and/or highly concentrated bicarbonate solutions including calcium carbonate, sodium carbonate, and others.

In one embodiment, the method can include recycling the collected aqueous sulfurous acid back to one or more venturi pumps of the sulfur burning system (e.g., see FIG. 3, dashed lines show recycling) for further acidification by sulfur dioxide. In one aspect, the method can include recycling the collected aqueous sulfurous acid through one or more recycling cycles until obtaining a desired pH of aqueous sulfurous acid. In one aspect, the produced aqueous sulfurous acid has a pH less than or about 2.25, or has a pH less than or about 2, or has a pH less than or about 1.75, or has a pH less than or about 1.5, or has a pH about 1.3. The method can include storing the aqueous sulfurous acid until the pH drops to about 1.0. In one aspect, the method can include passing the formed sulfur dioxide through at least three venturi pumps, which can lower the pH. This allows the pH of the sulfurous acid used to control the aquatic pests to be modulated as needed, either increased or decreased.

In one embodiment, the system 400 can include a computer configured as a system controller, the computer 290 can be operably coupled to one of more sensors 402 of: pH sensors; flow sensors; pumps; temperature sensors; fluid level sensors; sulfur level sensors; sulfur dioxide sensors; or oxygen sensors. In one aspect, the exhaust pipe directly from a sulfur burner chamber has one or more temperature sensors, which can be connected to the computer 290. In one aspect, the computer 290 can have a non-transitory memory device with computer-executable instructions for controlling operational parameters of the system. The one or more pH sensors can be included in the body of water being treated to control the aquatic pests, where the pH sensors can provide pH data to the computer so that the computer can control the system to provide appropriate treated acidic water to the water being treated to control the pests. For example, when the pH of the water having the aquatic pests is too high, the computer can operate the system to provide acidic water with a lower pH and/or more acidic water to reduce the pH of the water having the aquatic pests. When the pH of the water having the aquatic pests is too low, the computer can operate the system to reduce the flow of acidic water into that water having the aquatic pests. An example of the computer is provided in FIG. 4 and the description thereof is in WO 2016/183450, which is incorporated herein by specific reference in its entirety.

In view of the disclosure provided herein, it is now possible to achieve about 100% kill rates on these aquatic pest species in any size body of water at ambient temperature and pressure. The water treatment is performed through the addition of sufficient sulfurous acid (as well as any sulfites and bisulfites in the sulfurous acid) so as to reduce pH between about 6.0-about 6.5 over hours to days to weeks. The water treatment is performed without requiring confinement of the water, without pressurization, and without subsequent gas stripping (e.g., degassing, such as under vacuum). Data from testing in aquatic ponds demonstrates the water treatment is effective to achieve about 100% kill with a pH of about 6.0-about 6.5 on zebra mussels, Asiatic clams, and bryozoan. The data was obtained from three different ponds that were individually inoculated with one of the species zebra mussels, Asiatic clams, or bryozoa. A sulfur burner was used to generate the sulfurous acid, which was introduced into each pond. The mortality of each aquatic pest was measured progressively over time until all the aquatic pests in the pond were determined to be dead or at a level so low as to be unmeasurable.

The data indicates that introduction of sulfurous acid into the water results in the reduction of pH in the water having the aquatic pests in an amount sufficient that the acidity inhibits the life of the aquatic pests. For example, the pH may be reduced to 6.5, 6, 5.5, or 5. In one example, the pH may be reduced by 2 pH units (e.g., 7.5 to 5.5).

Also, the data indicates that the introduction of sulfurous acid to the water may also remove gaseous molecular oxygen from the water. The removal of oxygen may also inhibit the life of the aquatic pests.

Additionally, the data indicates that the addition of sulfurous acid into the water reduces $CO_3$ (carbonate) from the water. The removal of carbonate from water also removes the ability of an aquatic pests to form shells, exoskeletons, or bones or other body structures. As a result, the life of the aquatic pests is compromised.

Further, the data indicates that increasing sulfites can cause problems with ATP in the aquatic pests, reduce the thickness of hydrophilic gels of the aquatic pests, reduce the ability of the aquatic species to adhere to surfaces, denature chitin, affects sheen of the aquatic pests, and enzymatically inhibit glucose. The sulfites may also inhibit the life cycle of the aquatic pests in other ways.

Furthermore, the data indicates that the elevated levels of carbon dioxide from chemical reactions resulting from the sulfurous acid may inhibit the life cycle of the aquatic pests. The elevated carbon dioxide my also contribute to asphyxiation of the aquatic pests (e.g., such as mollusks), along with the reduction of dissolved molecular oxygen.

In one example, pH 6.5 removed algae in 15 days.

Data also shows that the treatment can reduce algae, bacteria, zebra mussel, Asian clam, apple snail, American crab, crayfish, Bryozoans. Treatment can provide clarified water from murky water having one or more of these aquatic pests.

Figure 5:
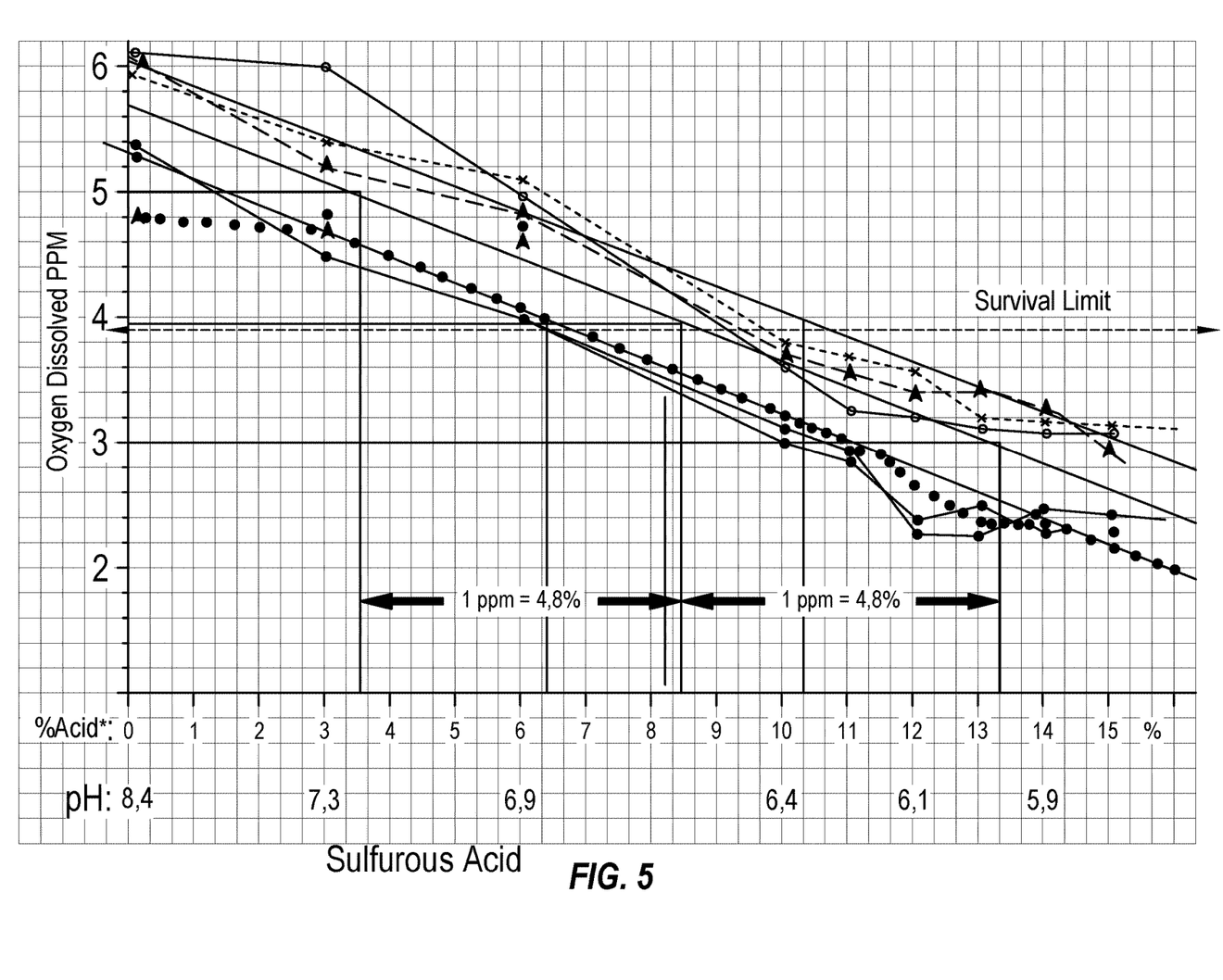
FIG. 5 includes a graph showing the reduction of oxygen in water treated with sulfurous acid.

Experiments were conducted by preparing sulfurous acid and introducing the sulfurous acid into water. The amount of oxygen dissolved in the water was then measured as a function of pH or percent of sulfurous acid added, and graphed in FIG. 5. Each line illustrates a different example run. As shown, the amount of oxygen decreases with the percent of added sulfurous acid increases and as the pH reduces. The survival limit for organisms is also shown to compare the achievable amount of reduced oxygen is well below the survival limit without the pH dropping too low. This shows the sulfurous acid can reduce oxygen and pH to control the aquatic pests without significantly reducing the pH to an undesirably low value.

Figure 6:
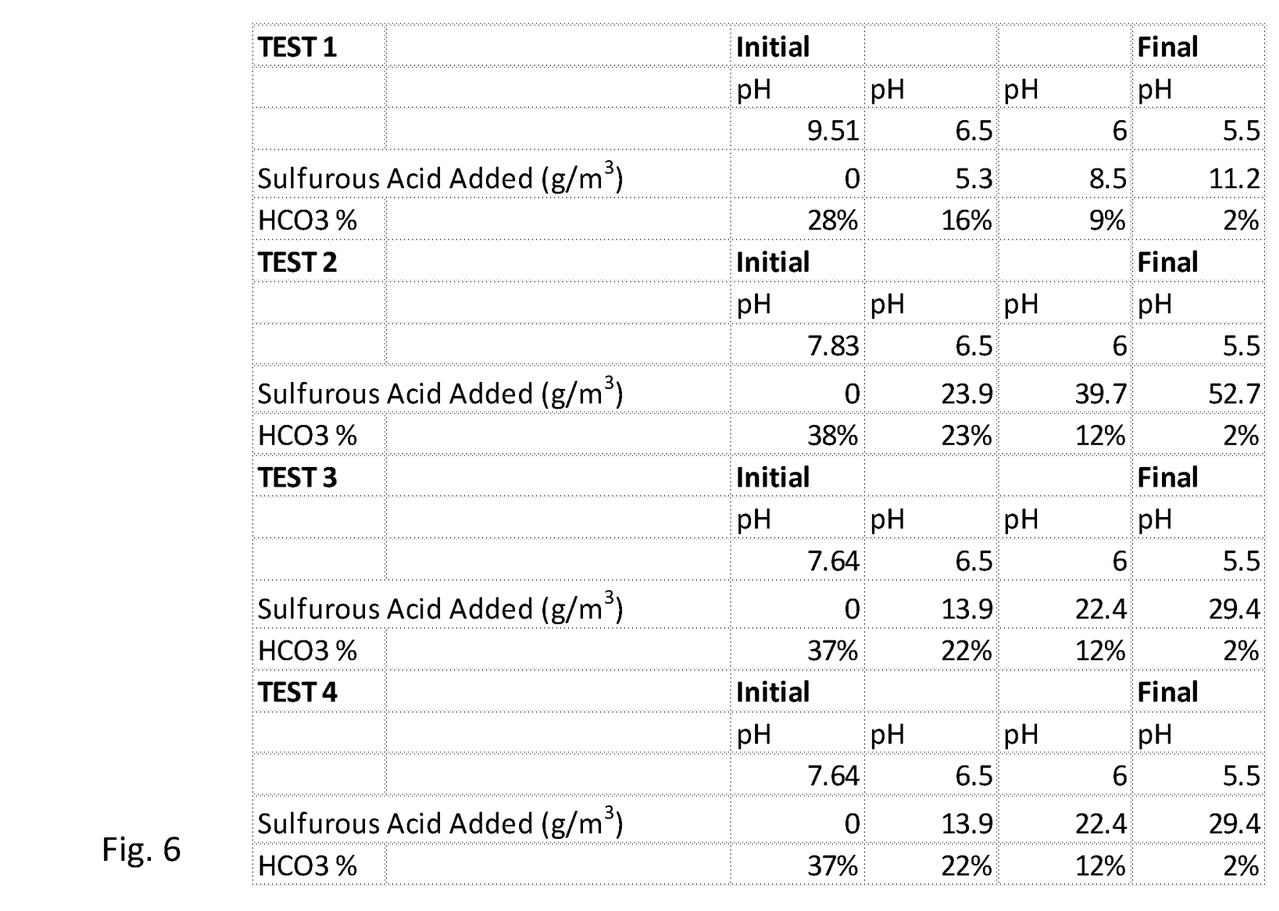
FIG. 6 includes a table of data showing the reduction in pH and carbonates upon introducing sulfurous acid.

FIG. 6 shows data for four different experiments when sulfurous acid is introduced into bodies of open water. As shown, the pH decreases to about 5.5 as sulfurous acid is added. The amount of carbonates (e.g., mono-, bi- etc.) in the treated water is reduced as more sulfurous acid is added. Such a reduction of carbonates may also reduce calcium in the water, and it has been found that reducing the calcium, such as by reducing the carbonate, may also help control the aquatic pests.

Based on the Experimental Results, the inventors determined some of the factors to control the pests with sulfurous acid, such as: (1) reduce pH of the water; (2) reduce dissolved oxygen in the water; (3) increase dissolved $CO_2$ in the water; (4) reduce bicarbonate so that the aquatic pests do not have sufficient bicarbonate for their life cycle, such as not being able to form shells, exoskeletons, or bones or other body structures; and (5) increasing sulfurous acid, sulfur, sulfur particulates, sulfites, and disulfites, that can be toxic to the aquatic pests.

Figure 7:
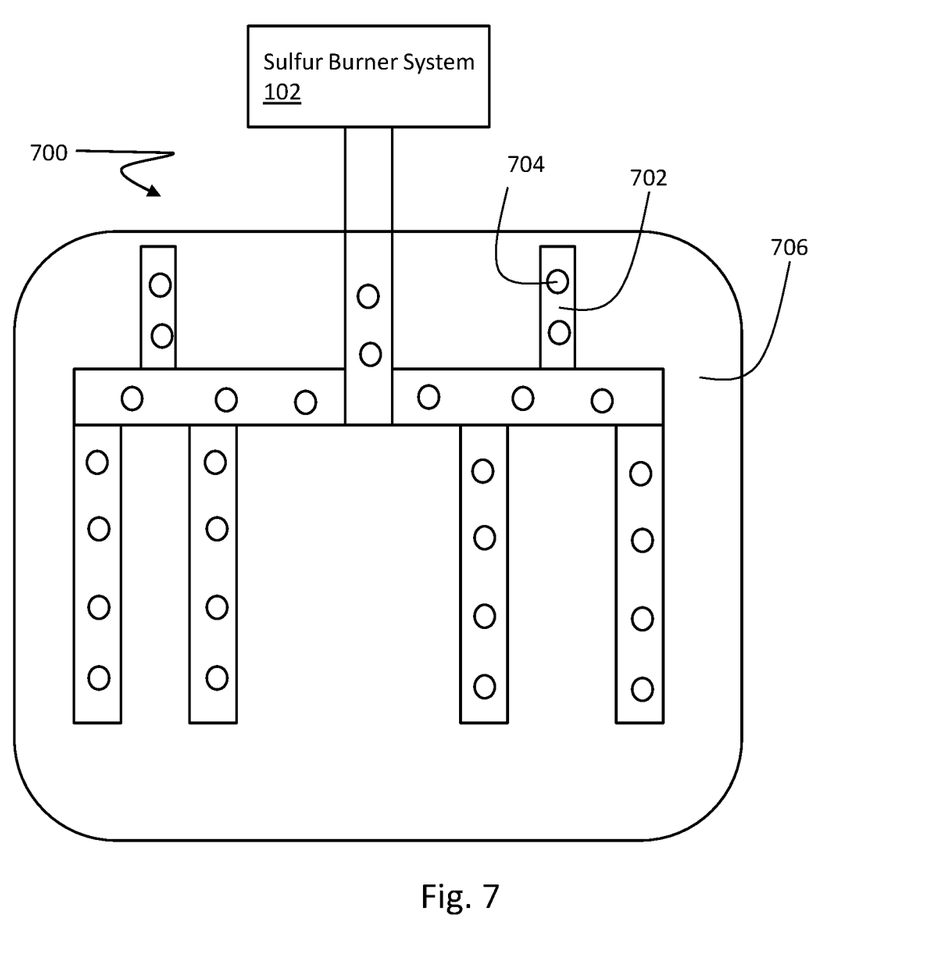
FIG. 7 shows an embodiment of a schematic of a distribution system for distributing sulfurous acid more uniformly into a body of water.

FIG. 7 shows an embodiment of a sulfurous acid distribution system 700 that includes a plurality of distribution lines 702, each distribution line including a plurality of outlets 704 (e.g., holes). The sulfurous acid distribution system 700 can be coupled to a sulfur burner system 102 to receive the sulfuric acid, which can be released from the outlets 704. This allows for a broader distribution of sulfuric acid throughout a body of water 706. The distribution lines 702 can be in any arrangement, pattern, size or other characteristic, and may have any number that can suitable release the sulfurous acid in a wide distribution across the body of water 706 in order to enhance the homogeneity of sulfurous acid release and the resulting pH and reaction produces with water.

In some instances, it can be beneficial to use a mixing strategy that distributes the sulfurous acid (or other acid) being introduced into the water. In part, the sulfurous acid being heavier than water can be advantageously used by distributing the release of sulfurous acid across a network of the distribution lines in an acid distribution system (e.g., FIG. 7). The distribution of release of acid can improve the mixing, so that the heavier sulfurous acid is distributed better in the water.

Table 1 provides a list of aquatic pests that may be controlled with the present invention.

TABLE 1

Examples of Aquatic Pests, Origins, and Invasive locations

| Species | Origin | Location |
|---|---|---|
| Jellyfish (Hydromedusae) | | |
| *Maeotias inexspectata* | Black Sea | Chesapeake Bay |
| Black Sea Jellyfish | | San Francisco Bay |
| *Blackfordia virginica* | Black Sea | Chesapeake Bay |
| Black Sea Jellyfish | | San Francisco Bay |
| Water Fleas (Cladocera) | | |
| *Bythotrephes cederstroemi* | Europe | Northeastern North America |
| Spiny water flea | | |
| Copepods (Copepoda) | | |
| *Limnoithona sinensis* | China | San Francisco Bay |
| *Oithona davisae* | Japan | San Francisco Bay |

TABLE 1-continued

Examples of Aquatic Pests, Origins, and Invasive locations

| Species | Origin | Location |
| --- | --- | --- |
| Sincalanus doerrii | China | San Francisco Bay |
| Pseudodiaptomus marinus | Japan | San Francisco Bay |
| Pseudodiaptomus inopinus | Asia | Columbia River |
| Pseudodiaptomus forbesi | China | San Francisco Bay |
| Crabs (Decapoda) | | |
| Hemigrapus sanguineus | Japan | Massachusetts to Virginia |
| Japanese short crab | | |
| Mussels, Clams, and Snails (Mollusca) | | |
| Dreissena polymorphia | Eurasia | Eastern North America |
| Zebra Mussel | | |
| Dreissena bugensis | Eurasia | Eastern North America |
| Quagga Mussel | | |
| Perna | South America | Gulf of Mexico |
| South American Mussel | | |
| Potamocorbula amurensis | China, Japan | San Francisco Bay |
| Asian clam | | |
| Philine auriformis | New Zealand | California |
| New Zealand Seaslug | | |
| Moss Animals (Bryozoa) | | |
| Membranipora membranacea | Europe | Gulf of Maine to New York |
| Kelp bryozoan | | |
| Fish (osteichthyes) | | |
| Neogobius melanostomus | Eurasia | Great Lakes |
| Round goby | | |
| Proterorhinus marmoratus | Eurasia | Great Lakes |
| Tubenose goby | | |
| Gynocephalus cernuus | Europe | Great Lakes |
| Ruffe | | |
| Mugihgobius parvus | Philippines | Hawaii |
| Philippine Goby | | |
| Cyanobacteria | Utah, USA | Utah Lake |

The treatment of water with sulfurous acid may also reduce other pests, such as mosquito larva (black mosquitoes), algae, cyanobacteria, bacteria, snails, crabs, flies, water flies, or others. In one embodiment, the present invention includes determining that a body of water includes a pest, and then testing to determine if sulfurous acid can control the aquatic pest in accordance with this disclosure.

In some embodiments, the sulfurous acid can be used to treat bodies of water infested with cyanobacteria (also known as cyanophyta). Cyanobacteria are a phylum of bacteria that is often referred to as blue-green algae. Examples of Orders of cyanobacteria can include Chroococcales (e.g., Pleurocapsa, Aphanocapsa, Merismopedia, Gloeocapsa, and Microcystis), Pleurocapsales (e.g., Chroococcidiopsis, Pleurocapsa, Dermocarpella, Xenococcus), Oscillatoriales (e.g., Phormidium, Microcoleus, Lyngbya, Planktrothrix), Nostocales (e.g., Cylindrospermopsis, Calothrix, Anabaena, Nostoc), Stigonematales (e.g., Stigonema and Mastigocladus), and Gloebacterales. Examples of cyanobacteria include Microcystis aeruginosa, Cylindrospermopsis raciborskii, Anabaena circinalis, Cyanophora paradoxa, Nostoc commune and others. Cyanobacteria are more common in still water, and less likely in flowing water. Higher temperatures also favor cyanobacteria growth. Cyanobacteria are an aquatic pest that produces significant toxins (cyanotoxins) and causes damage to water processing equipment. Cyanotoxins include neurotoxins, hepatotoxins, cytotoxins, and endotoxins. Some examples of cyanotoxins include: cyclic peptides microcystins (e.g., liver toxicity produced by genera Microcystis, anabaena, planktothrix, Nostoc, Hapalosiphon, and Anabaenopsis) and nodularins (e.g., liver toxicity produced by genera Nodularia); alkaloids anatoxin-a (e.g., nerve synapse toxicity produced by genera Anabaena, Planktothrix, and Aphanizomenon), anatoxina(S) (e.g., nerve synapse toxicity produced by genera Anabaena), cylindrospermopsins (e.g., liver toxicity produced by genera Cylindrospermopsis, Aphanizomenon, and Umezakia), lyngbyatoxin-a (e.g., skin and gastrointestinal tract toxicity produced by genera Lyngbya), saxitoxin (e.g., nerve synapse toxicity produced by genera Anabeana, Aphanizomenon, Lyngbya, and Cylindrospermopsis), and lipopolysaccharides (e.g., general irritant produced by all cyanobacteria); polyketide Aplysiatoxins (e.g., skin toxicity produced by genera Lyngbya, Schizothrix, and Planktothrix); and peptide toxin beta-methylamino-L-alanine (BMAA) (e.g., nervous system toxin produced by all cyanobacteria). Most cyanobacteria are alkaliphiles, which means they prefer alkaline water. Now, cyanobacteria in any type of water body can be controlled with sulfurous acid, which can reduce the negative environmental impact as well as the toxicity associated with cyanobacteria.

It has now been found that sulfurous acid significantly controls cyanobacteria in a body of water to a significant degree such that a flowing outlet from the body of water was substantially free of cyanobacteria and cyanotoxins. The Daybreak reservoirs of the City of Daybreak, Utah, were treated with sulfurous acid sufficiently to control the cyanobacteria, which resulted in a "non-detect" on all cyanobacteria. As a control, Jordan Canal water, which was infected with cyanobacteria from Utah Lake, is directed to Daybreak and other areas. While treatment controlled cyanobacteria in Daybreak reservoirs, other areas that receive water from the Jordan Canal were still testing positive for cyanobacteria. As such, the treatment of sulfurous acid controlled the cyanobacteria in view of water ways further away (e.g., Blackridge Reservoir, Jordan River Narrows, and Wheeler Farm East Canal) still containing cyanobacteria. The Daybreak reservoirs (e.g., surge pond) were treated with sulfurous acid to maintain a pH between 6.8-7, wherein within 2 weeks they were free of cyanobacteria and anatoxin-a. However, no fish or other animals were determined to be killed by the sulfurous acid, and thereby the sulfurous acid controls cyanobacteria while maintain other desirable aquatic life. Since cyanobacteria are harmful to fish, the sulfurous acid actually improves the health of fish in the treated water. Waterways downstream from the Daybreak reservoirs were also found to be free of cyanobacteria.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety: PCT/US2016/050253; WO 2016/183450; U.S. 62/278,831; U.S. 62/214,656, U.S. Pat. Nos. 8,951,479; 7,767,162; 7,182,919; 6,689,326; 6,506,347; 6,500,391; 6,248,299; 6,080,368; U.S. RE-42,239; and U.S. 20003/0211018; U.S. Pat. No. 3,235,328 A; WO 2010089055 A3; and U.S. Pat. No. 4,016,207. It is noted that the sulfur burning systems and methods of forming sulfur dioxide and sulfurous acid in these incorporated references can be used to prepare the sulfur dioxide and sulfurous acid that is used to control the aquatic pests as described herein.

The invention claimed is:

1. A method of controlling aquatic pests, the method comprising:
introducing sulfurous acid into water having the aquatic pests to treat the water until the aquatic pests are controlled by killing said aquatic pests,
wherein:
the water is selected from open water, flowing water, or water open to the atmosphere; and
the sulfurous acid is at least one of:
introduced into the water after being generated from sulfur dioxide and water; or
introduced into the water during generation of the sulfurous acid from sulfur dioxide being introduced into the water.

2. The method of claim 1, further comprising controlling the pests by killing at least about 75% of the aquatic pests in the water with the sulfurous acid.

3. The method of claim 1, further comprising controlling the pests by inhibiting spread of the aquatic pests from the water or from the water into another body of water with the sulfurous acid.

4. The method of claim 1, wherein the aquatic pest is selected from the group consisting of a zebra mussel, Asiatic clam, bryozoa, cyanobacteria and mixture thereof.

5. The method of claim 4, wherein the aquatic pest is cyanobacteria.

6. The method of claim 4, comprising introducing the sulfurous acid to obtain treated water that has a pH of at least about 5.5.

7. The method of claim 1, comprising introducing the sulfurous acid without increasing pressure of the treated water.

8. The method of claim 1, comprising introducing the sulfurous acid to obtain treated water, wherein the treated water has about 100% kill of:
bryozoa in about 48 hours or less with the sulfurous acid;
zebra mussels in about 5 days or less with the sulfurous acid; or
Asiatic clams in about one month or less with the sulfurous acid.

9. The method of claim 1, comprising introducing the sulfurous acid to obtain treated water having $SO_2$ concentrations or sulfurous acid concentrations at 2.84% to 28.4% in the treated water.

10. The method of claim 1, comprising forming the sulfurous acid by introducing sulfur dioxide into water and then introducing the sulfurous acid into the water having the aquatic pest.

11. The method of claim 1, comprising:
forming the sulfur dioxide; and
introducing the sulfur dioxide into the water in order to introduce the sulfurous acid to the water.

12. The method of claim 1, comprising:
burning sulfur to produce exhaust having sulfur dioxide;
introducing the exhaust into water to produce sulfurous acid; and
introducing the sulfurous acid into the water having the aquatic pests to treat the water until the aquatic pests are controlled.

13. The method of claim 1, comprising:
burning sulfur to produce exhaust having sulfur dioxide;
introducing the exhaust into water to produce aqueous sulfurous acid;
introducing the exhaust into the sulfurous acid to decrease pH of the aqueous sulfurous acid; and
introducing the aqueous sulfurous acid with the decreased pH into the water having the aquatic pests to treat the water until the aquatic pests are controlled.

14. The method of claim 1, wherein the pests are controlled by one or more of the following factors from the introduction of sulfurous acid (1) reducing pH of the water; (2) reducing dissolved oxygen in the water; (3) increasing dissolved $CO_2$ in the water; (4) reducing bicarbonate so that the aquatic pests do not have sufficient bicarbonate for their life cycle, and are not able to form shells, exoskeletons, or bones or other body structures; and (5) increasing sulfurous acid, sulfur, sulfur particulates, sulfites, and disulfites, that can be toxic to the aquatic pests.

15. The method of claim 5, further comprising:
introducing the sulfurous acid into the water for a duration that kills at least 95% of the cyanobacteria without controlling a target organism, the target organism being a native animal in the water or an non-pest animal that is introduced into the water.

16. The method of claim 1, wherein the aquatic pests are controlled within a control distance, which is within a distance of less than a mile from the site of introducing the sulfurous acid.

17. The method of claim 1, wherein the aquatic pest is selected from the group consisting of:
Jellyfish (Hydromedusae); Maeotias *inexspectata*; Black Sea Jellyfish; Blackfordia *virginica*; Black Sea Jellyfish; Water Fleas (Cladocera); *Bythotrephes cederstroemi*; Spiny water flea; Copepods (Copepoda); Limnoithona *sinensis*; Oithona davisae; Sincalanus doerrii; Pseudodiaptomus *marinus*; Pseudodiaptomus inopinus; Pseudodiaptomus *forbesi*; Crabs (Decapoda); Hemigrapus *sanguineus*; Japanese short crab; Snails (Mollusca); *Dreissena* polymorphia; Zebra Mussel; *Dreissena* bugensis; *Quagga* Mussel; Perna;
South American Mussel; Potamocorbula *amurensis*; Asian clam; Philine auriformis; New Zealand Seaslug; Moss Animals (Bryozoa); Membranipora membranacea; Kelp bryozoan; *Neogobius melanostomus*; Round goby; Proterorhinus marmoratus; Tubenose goby; Gynocephalus *cernuus*; Ruffe; Mugiligobius *parvus*; Philippine Goby; and cyanobacteria.

18. A method of controlling aquatic cyanobacteria, the method comprising:
producing sulfurous acid; and
introducing the sulfurous acid into water having the aquatic cyanobacteria to treat the water until the treated water has a pH of between about 5.5 and about 7 so that the aquatic cyanobacteria are controlled by killing said cyanobacteria.

19. The method of claim 1, further comprising spraying the sulfurous acid to provide a dose of sulfurous acid to the aquatic pest.

20. The method of claim 18, further comprising spraying the sulfurous acid to provide a dose of sulfurous acid to the aquatic cyanobacteria.

* * * * *